June 25, 1957 T. E. WOODRUFF 2,797,403

RECORDING SYSTEM

Filed Feb. 10, 1950 8 Sheets-Sheet 1

Inventor:
Thomas E. Woodruff,
by Merton D. Moore
His Attorney.

Inventor:
Thomas E. Woodruff,
by Merton D. Moore
His Attorney.

Inventor:
Thomas E. Woodruff,
by Merton D. Moore
His Attorney.

June 25, 1957 T. E. WOODRUFF 2,797,403

RECORDING SYSTEM

Filed Feb. 10, 1950 8 Sheets-Sheet 4

Inventor:
Thomas E. Woodruff,
by Merton D. Moore
His Attorney.

June 25, 1957 T. E. WOODRUFF 2,797,403

RECORDING SYSTEM

Filed Feb. 10, 1950 8 Sheets-Sheet 5

Inventor:
Thomas E. Woodruff,
by Merton D. Moore
His Attorney.

June 25, 1957 T. E. WOODRUFF 2,797,403

RECORDING SYSTEM

Filed Feb. 10, 1950 8 Sheets-Sheet 6

Inventor:
Thomas E. Woodruff,
by Merlon W. Moore
His Attorney.

Inventor
Thomas E. Woodruff
by Merton W. Moore
His Attorney

Inventor:
Thomas E. Woodruff,
by Merton D. Moore
His Attorney.

United States Patent Office 2,797,403

Patented June 25, 1957

2,797,403

RECORDING SYSTEM

Thomas E. Woodruff, Redondo Beach, Calif., assignor to General Electric Company, a corporation of New York Application February 10, 1950, Serial No. 143,487

17 Claims. (Cl. 340—203)

My invention relates to communication systems and particularly to the telemetering of a plurality of distinct data.

In the past few years, there has been increasing application of radio to telemetering, and particularly to the extension of the geographical boundary within which routine weather observation may be made. A common method employed to obtain upper air observation involves sending aloft, attached to small ballons, meterological instruments with associated miniature radio transmitting equipment. Various instruments sent aloft with the balloons measure the required information such as barometric pressure, air temperature, relative humidity, etc. The response of these measuring instruments are then employed to modulate the radio transmitter. A method presently employed involves audio modulation of the pulse recurrence frequency of the high frequency carrier waves in accordance with the measured values of these various data.

An object of my invention is to provide an improved signalling system adapted to high speed transmission and accurate recording.

Another object of my invention is to provide automatic compensation for drift in timing circuits employed in timed signal communication systems.

Another object of my invention is to provide an arrangement for transmission of a reference signal from one station for comparison with a corresponding signal generated at a second station for control purposes.

Another object of my invention is to provide accurate recording of data transmitted from a remote station despite relative drift in the timing circuits of the transmitter and receiver stations.

Another object of my invention is to provide improved synchronizing of the timed transmission of data with the reception and recording of the data.

Another object is to provide more reliable and rapid recording of data transmitted in time division pulse multiplex manner and processed sequentially through a single channel.

Figure 2:
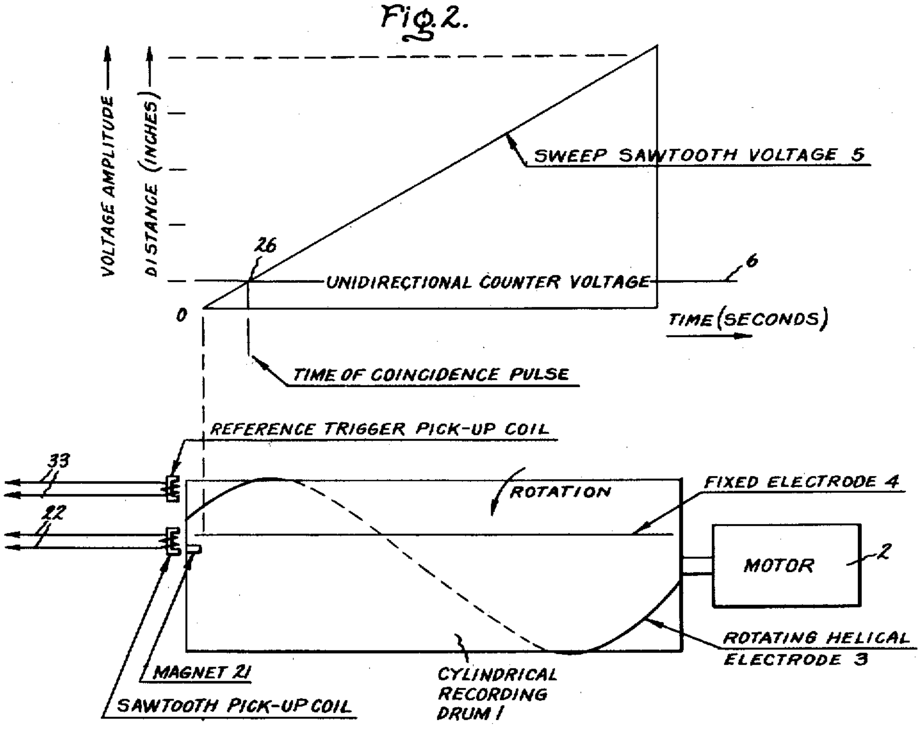
Figure 3:
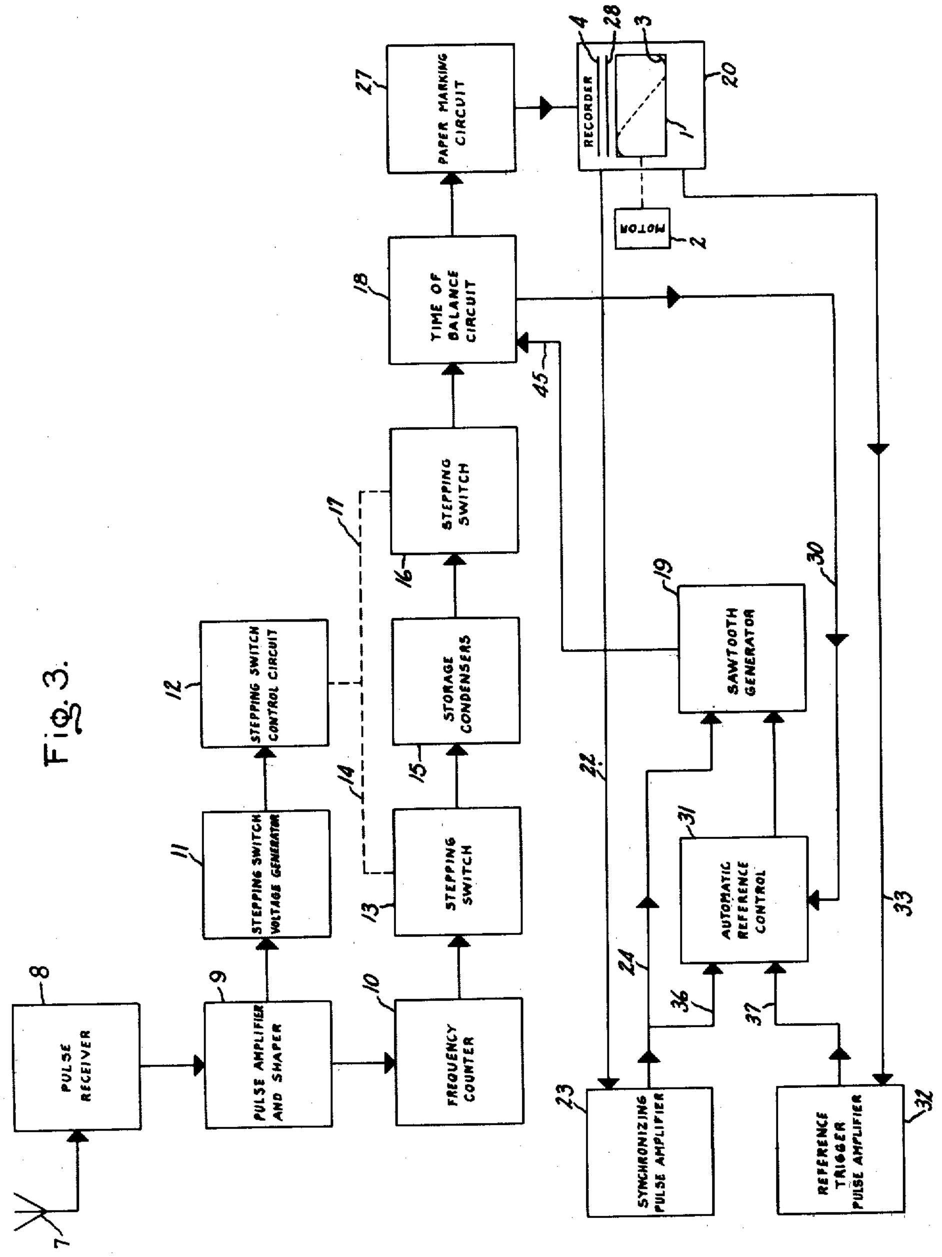
Figure 4:
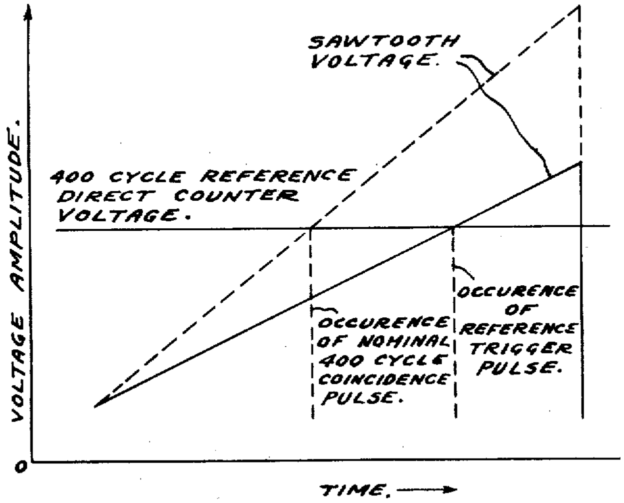
Figure 9:
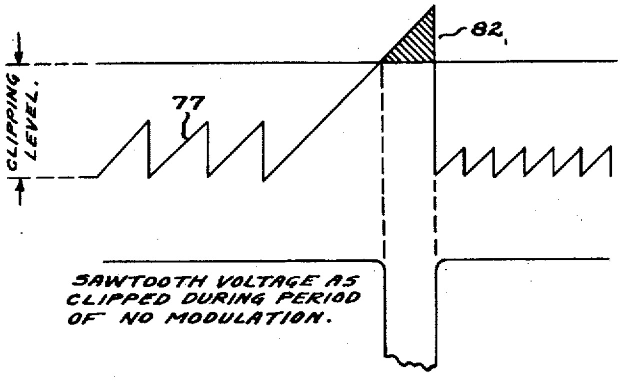
Figure 5:
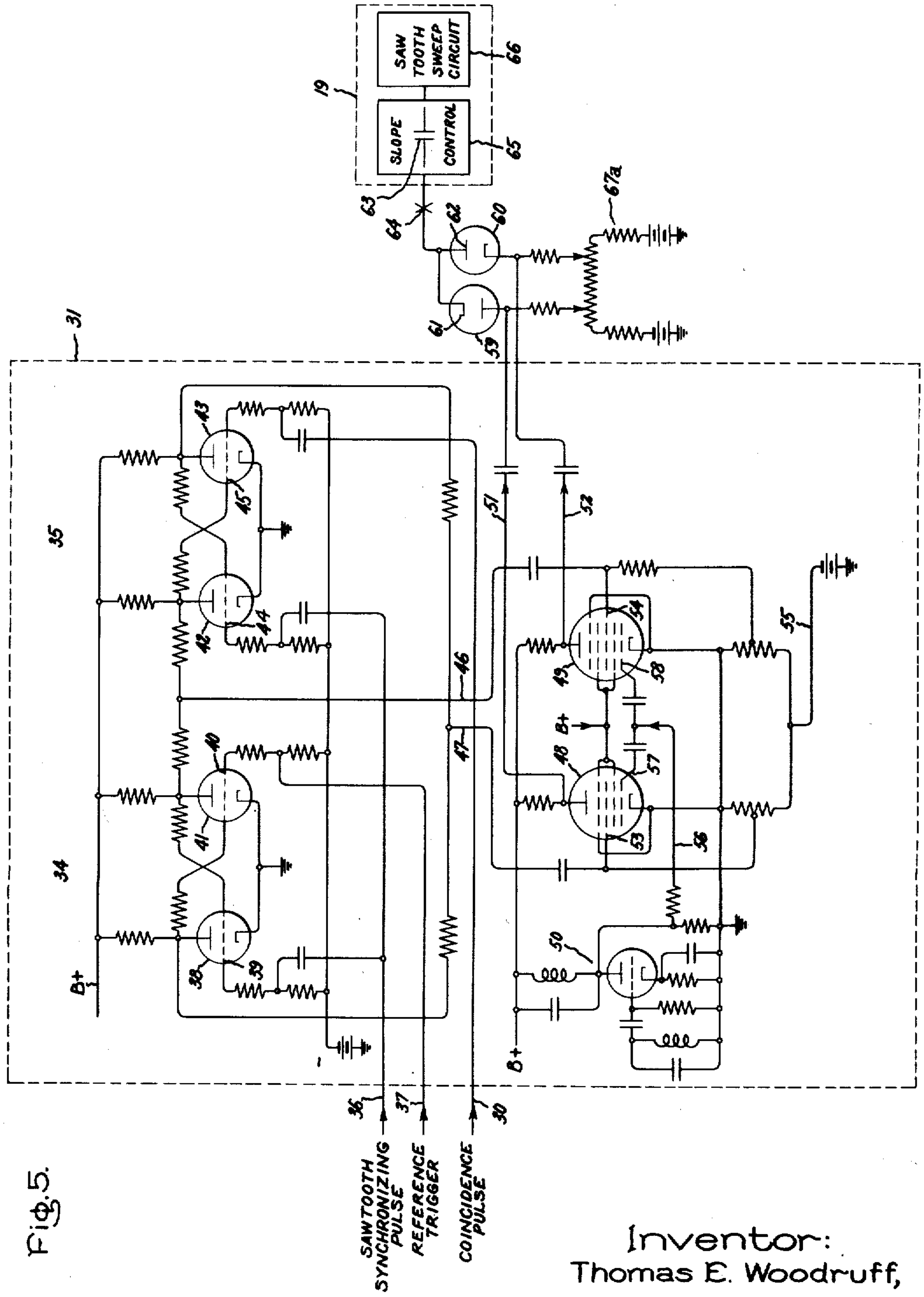
Figure 6:
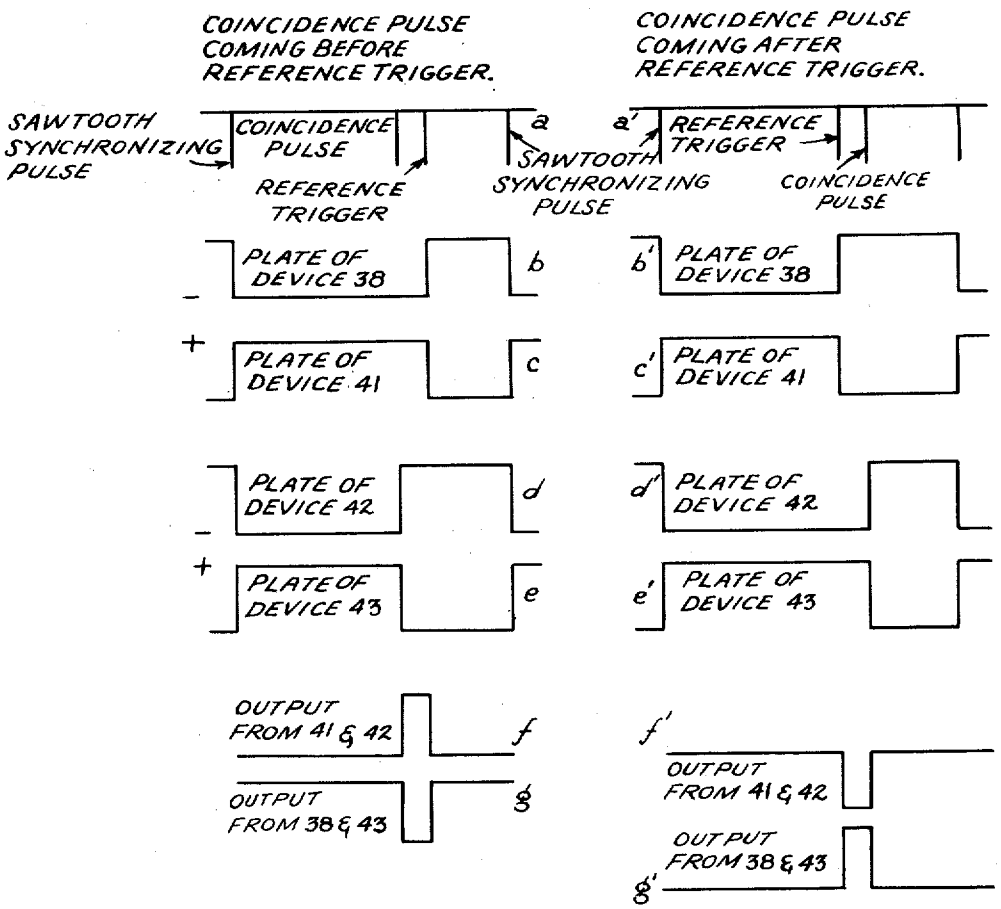
Figure 7:
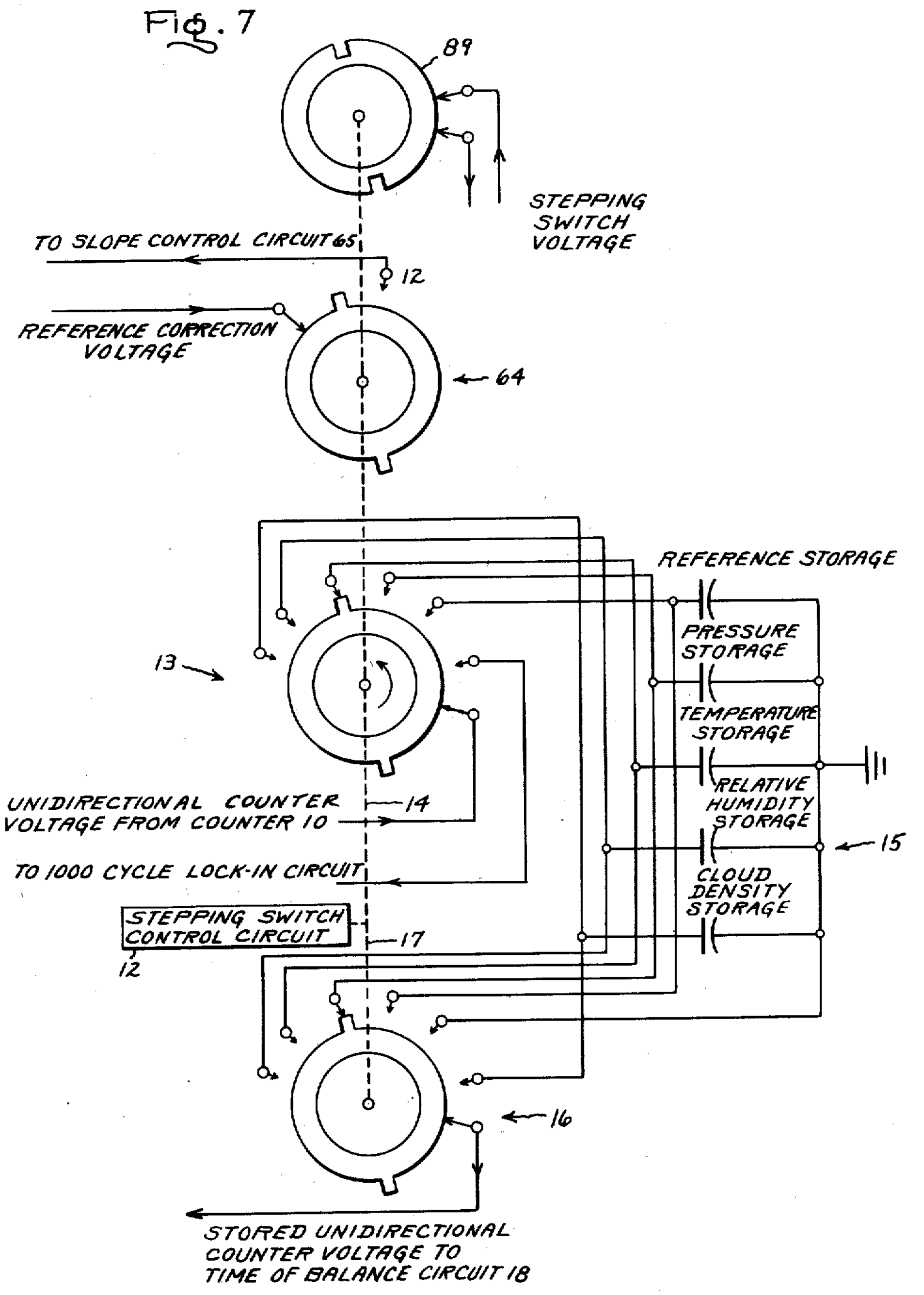
Figure 8:
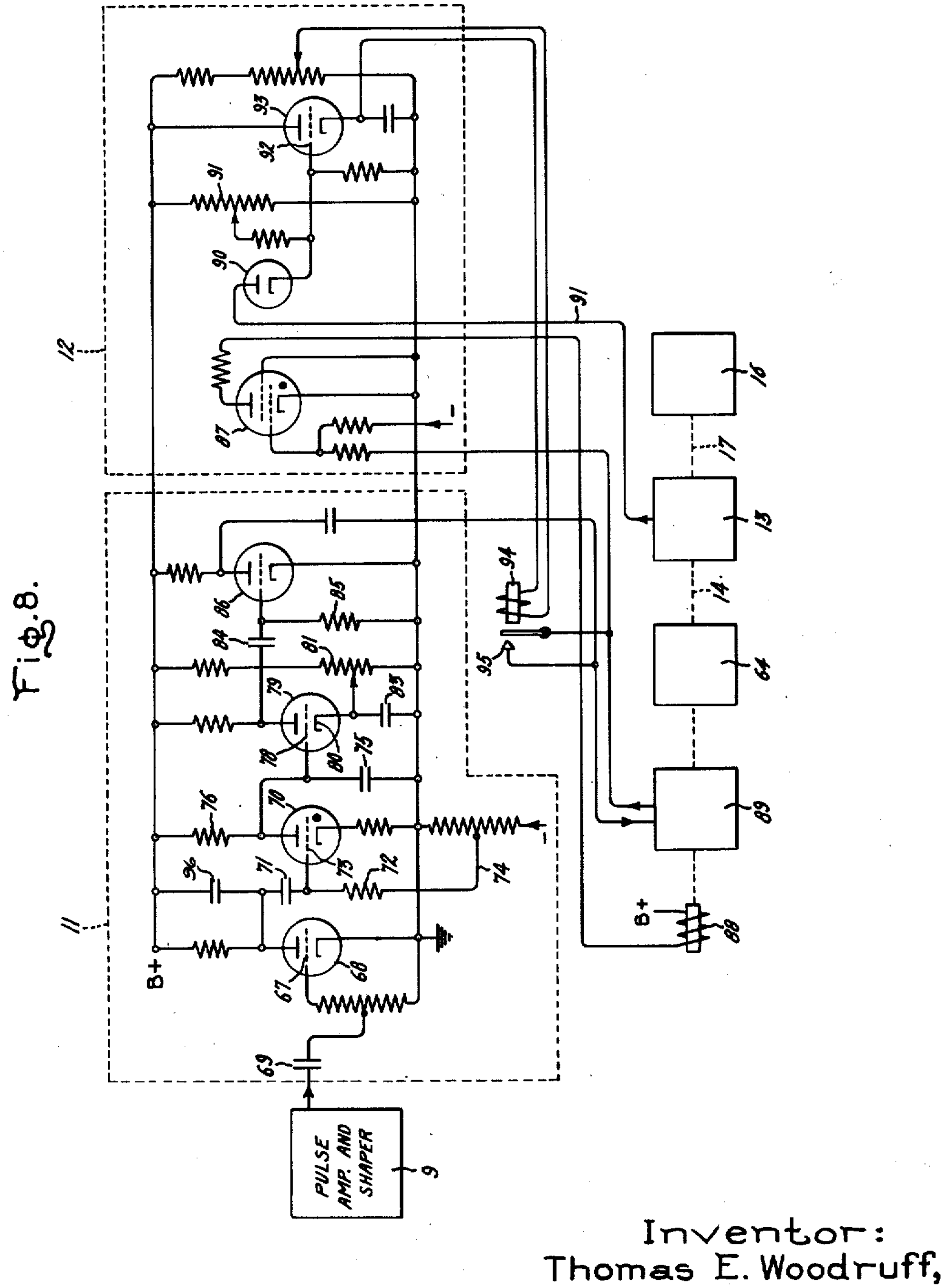

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing wherein Fig. 1*a* shows a typical signal transmission characteristic used in explaining my invention, Fig. 1*b* illustrates a typical recording of the transmitted data, Fig. 2 illustrates a drum type recorder employing scanning electrodes and the sawtooth wave employed in calibrating the scanning, Fig. 3 shows in block diagram form an embodiment of my invention applied to a complete receiving and recording arrangement, Fig. 4 shows graphically the nature of the timing control effected in the recording circuit employed, Fig. 5 illustrates in circuit diagram form the manner of processing the reference signals transmitted from the remote station for purposes of controlling the recording circuit, Fig. 6 illustrates the nature of the control voltages employed in the recording circuit, Fig. 7 illustrates the nature of the switching and data storage circuits, Fig. 8 shows in circuit diagram form the manner in which the stepping switch voltage is derived and how the synchronizing of the transmitter and receiver switching circuits is achieved, and Fig. 9 illustrates the nature of the stepping switch voltage wave shape and how it is evolved.

Figures 1A, 1B:
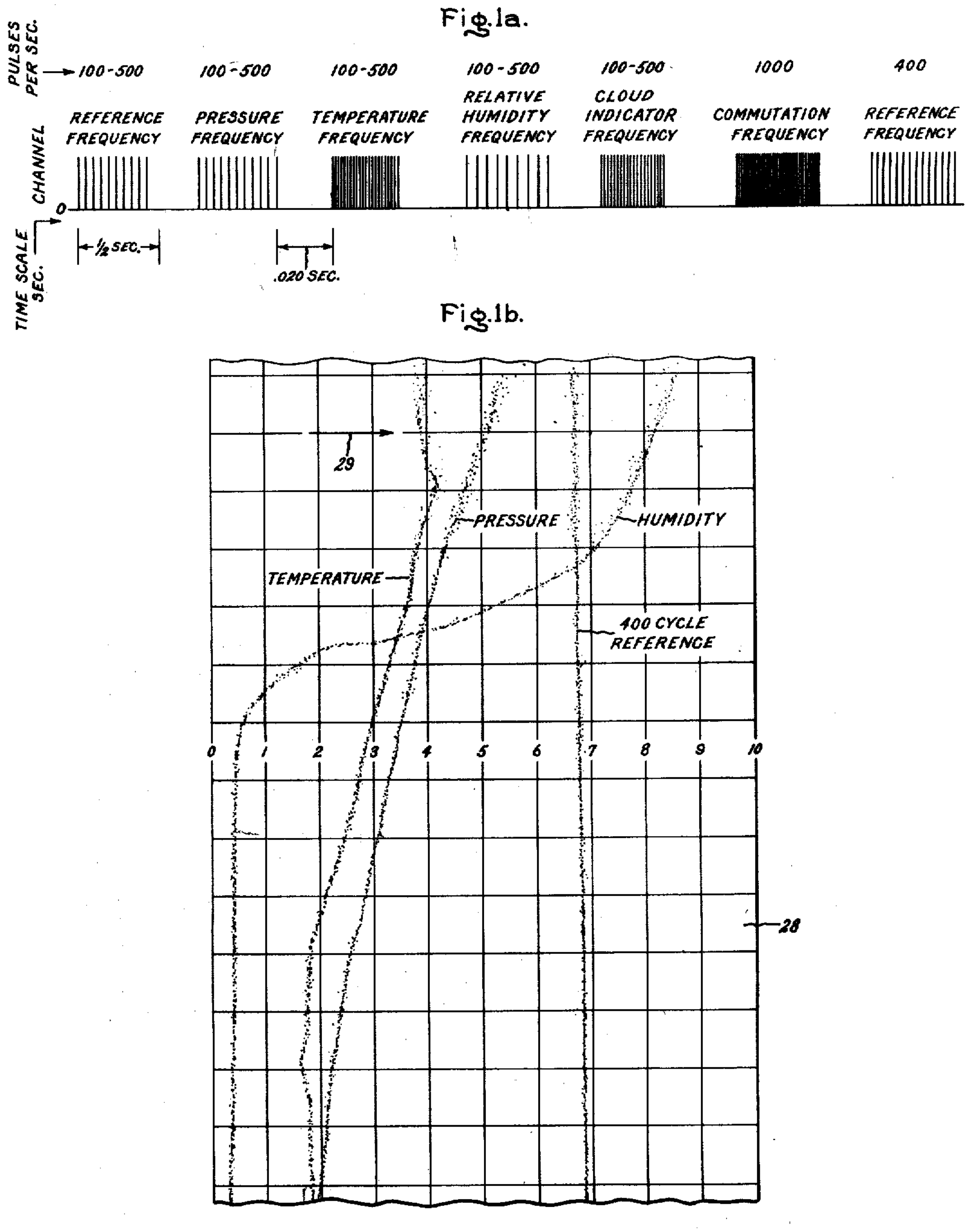

Referring to Figs. 1*a* and 1*b*, there is shown a typical meteorological transmission wherein the successive samplings of the various information are available as discrete pulse recurrence rate modulations of the airborne transmitter carrier energy for one-half second periods. A tweny millisecond no-modulation period is employed between samplings to facilitate separation of the various data at the receiving station. The modulation equipment may take the form disclosed in U. S. patent to B. K. Hawes 2,418,836, dated April 15, 1947, and entitled "Remote Recording System," or as disclosed in the copending application of D. J. Epstein, Serial No. 795,067, "Pulse Generator," filed December 31, 1947, now Patent No. 2,588,098, dated March 4, 1952, and assigned to the same assignee.

Briefly, the manner in which the transmitted data is processed is as folows: The one-half second groups of audio modulated pulses shown in Fig. 1*a*, which are separated by a 20 millisecond interval of no modulation, are each first converted after reception to a unidirectional countervoltage having an amplitude proportional to the recurrence rate of the pulses. Each of these unidirectional voltages, corresponding to a respective bit of information, is applied sequentially to a separate or individual storage device by the action of a stepping switch. The 20 millisecond interval between pulses is employed to advance the stepping switch. It is also arranged that when the switch is advanced, it applies a unidirectional voltage already stored in one of the storage devices to a common recording device. Thus all the information is made available on a single record as shown in Fig. 1*b*.

The recording device contemplated is of the type disclosed in U. S. patent application of R. F. Shea, Serial No. 137,238, entitled "Recording System," and assigned to the same assignee, now Patent 2,635,032, issued April 14, 1953. Briefly, a recording circuit of this type comprises a drum 1, Fig. 2, driven by motor 2 and having a helically wound electrode 3 mounted on the surface of the drum for scanning, during drum rotation, the length of a fixed electrode 4 spaced therefrom. The scanning by the moving electrode 3 of the fixed electrode 4 is calibrated with the aid of a sawtooth wave 5, as shown in Fig. 2, whose amplitude corresponds to successive positions of scan of the fixed electrode. A coincidence, or time of balance circuit is employed to produce a coincidence pulse during equality of amplitude of the unidirectional countervoltage 6 indicative of the transmitted information and the amplitude of the sawtooth wave. This coincidence pulse is then applied between the recording drum electrodes to produce a discharge therebetween. Electrically sensitive paper mounted between the two electrodes receives a mark during this discharge, which is representative of the value of the unidirectional countervoltage. The nature of the recording is clearly set forth in Fig. 1*b*.

In considering a pulse system of the type mentioned, it becomes apparent that should the timing circuits of the transmitting or receiving stations drift, an error in the recording will result. In the embodiment disclosed, the recorder is provided with an automatic reference control in order to compensate, for example, for audio frequency drift in the balloon-borne transmitter. The compensation for drift is accomplished by means of a nominal 400 cycle reference signal sent out by the transmitter once during each complete data sampling period as shown in Fig. 1*a*. A coincidence pulse corresponding to the balloon-borne transmitter nominal 400 cycle transmission, is compared to the time occurrence of a locally generated reference trigger pulse in the automatic reference control circuit. This reference trigger occurs at a specified point of intersection between the helical and fixed electrodes of Fig. 2 and corresponds to the 400 cycle line of the recorder chart. The resulting comparison signal is used to vary the slope of the sawtooth sweep 5 of Fig. 2, indicative of the scanning position of the recorder electrodes, to compensate for frequency drift of the nominal 400 cycle radio transmission. The change in slope of the sawtooth sweep will keep the nominal 400 cycle frequency printing on the 400 cycle line of the electrically sensitive material or chart.

The block diagram of Fig. 3 shows in greater detail the functioning of the various circuits. The information available in the form shown in Fig. 1*a* is received by antenna 7 at the ground station and passed successively through pulse receiver 8, pulse amplifier and shaper 9 to the frequency counter 10 which converts the pulses into a unidirectional voltage having an amplitude corresponding to the repetition rate of the received pulses.

As previously mentioned, the time interval between modulations shown in Fig. 1*a* is employed to generate a stepping voltage in block 11. This stepping voltage is then applied to a stepping switch control circuit 12. In order to provide smooth transmission of the unidirectional voltage level to the recording apparatus, the output of counter 10 is sequentially applied through stepping switch 13, under control of stepping switch control circuit 12 and connection 14, to respective storage condensers shown at 15 in Figs. 3 and 7. These storage condensers therefore retain charges corresponding to the measured value of the different bits of information considered. The outputs of the storage condensers are in turn successively applied by means of stepping switch 16, under control of the stepping switch control circuit 12 by means of element 17, to a time of balance circuit 18.

The time of balance circuit 18 functions to compare the amplitude of the unidirectional voltage received from the various condensers of block 15 with the amplitude of a calibrating voltage from generator 19.

In a preferred arrangement the calibrating voltage comprises the sawtooth voltage 5 of Fig. 2. The amplitude of this sawtooth voltage at any instant is representative of the point of intersection of the movable and fixed electrodes and hence the instantaneous position of scan along the fixed electrode. If the sawtooth wave is arranged to have a sufficient amplitude to include the range of unidirectional voltages corresponding to 100–500 pulses per second of the meteorological data, Fig. 1*a*, and is linear, a direct linear relationship exists between sawtooth amplitude, the displacement of the position of scan along the fixed electrode 4, the unidirectional voltage from counter 10 and hence the value of the data transmitted.

The recorder 20 as previously mentioned comprises motor 2 of Fig. 3, which is employed to drive drum 1 containing thereon the helically wound electrode 3. Electrode 3 is spaced from the fixed electrode 4 such that electrode 3 progressively scans the length of the electrode 4 during drum rotation. In the preferred arrangement of Fig. 2, a magnet 21 embedded near one end of electrode 3 is caused to induce an electrical impulse in line 22 feeding the synchronizing pulse amplifier 23. This pulse is shaped and transmitted over line 24 for commencing the generation of the sawtooth by generator 19 thereby synchronizing the drum 1 rotation and the generation of the sawtooth wave. The time of balance circuit 18 compares the amplitude of the sawtooth applied over line 45 with the unidirectional countervoltage available from stepping switch 16. As shown in Fig. 2, at the instant 26 when the sawtooth voltage 5 equals the unidirectional countervoltage 6, a coincidence pulse is produced which feeds the paper marking circuit 27 of Fig. 3. The output of the paper marking circuit, comprising a high voltage impulse, is applied between electrodes 3 and 4 to produce a mark on the electrically sensitive paper 28 mounted therebetween.

The sawtooth generator 19 provides a sawtooth sweep voltage at a relatively low repetition rate, for example 6 cycles per second, which does not deviate substantially from a straight line curve. A preferred circuit for 19, disclosed in greater detail in the copending application of Thomas E. Woodruff, entitled Linear Sawtooth Generator, Serial No. 143,488, filed February 10, 1950, and assigned to the same assignee, operates on the principle of closely controlling the charging current to a capacitor. After each complete rotation of the helix, the capacitor is discharged through a thyratron and a new sweep is started. The point at which the paper 28 is marked is determined by the time of coincidence between the unidirectional countervoltage available at 15 as stored in a respective storage capacitor, the sawtooth sweep voltage, and the location at that moment of the point of intersection of the helical and fixed electrodes. Because the sawtooth voltage has a definite relationship to the moving point of electrode intersection, if a time of coincidence is established between the sawtooth and unidirectional countervoltages, the chart will be marked at the correct point. This time is established as previously mentioned by the generation of a coincidence pulse in the time of balance circuit 18 which is fed to the paper marking circuit 27.

The drum, during each cycle of rotation, scans the width of paper 28, Fig. 1*b*, in the direction 29 leaving a mark at a distance from the point of commencement of the scan corresponding to the value of the particular data being processed. In a preferred arrangement the recording drum and sawtooth wave complete a cycle in one sixth of a second. Thus it is possible to compare the sawtooth wave three times with each transmitted data during the one-half second transmission period (Fig. 1*a*) and hence obtain three marks on the paper. Since the paper is arranged to travel in the direction of its length, a continuous record of all data may be obtained. Furthermore, the desirability of employing storage condensers becomes apparent since even if only one out of three comparisons of the unidirectional voltage with the sawtooth wave is instrumental in marking the paper, a recording may still be obtained. Many schemes are available for producing an impulse during coincidence of two varying electrical quantities. A preferred arrangement employs a saturable reactor biased to nonconduction by means of the variable unidirectional countervoltage available from switch 16. By applying the sawtooth voltage in opposition to this non-conducting bias, the reactor is caused to commence conduction when the sawtooth voltage rises above the direct countervoltage. Conduction in the primary of the saturable reactor causes the core of the saturable reactor to saturate and induce a strong voltage impulse in the secondary which is fed to the paper marking circuit 27.

The recorder is provided with automatic reference control in order to detect and compensate for audio frequency drift in the balloon-borne transmitter. The compensation for drift is accomplished by means of a nominal 400 cycle reference signal sent out by the airborne transmitter once for every periodic sampling of the various meteorological data shown in Fig. 1*a*. The unidirectional countervoltage taken from the frequency counter 10 of Fig. 3 and corresponding to the balloon-borne transmitter's nominal 400 cycle transmission is first compared with the sawtooth voltage in the time of balance circuit 18 to produce a coincidence pulse which is then transmitted over a line 30 for comparison with a reference trigger in the automatic reference control circuit 31 to detect any differences. The reference trigger pulse is available from reference trigger pulse amplifier 32. In a preferred arrangement a second small magnet (not shown) similar to that employed for deriving the above-described sawtooth synchronizing signal available over lead 22 of Fig. 2 is associated with the recording drum 1. As the drum rotates a voltage is induced in line 33, Figs. 3 and 2, for transmittal to the reference trigger amplifier 32. The pickup coils corresponding to the sawtooth synchronizing impulse available over lead 22 and the reference trigger available over lead 33 are so spaced mechanically that one coil for producing the sawtooth synchronizing impulse has a voltage induced in it slightly before the time of intersection between the helical and fixed electrode at one side of the drum, and the other coil for providing the reference trigger is mounted so that a voltage is induced in it at a time when the helix intersects the knife edge a predetermined distance across the recorder corresponding to a 400 cycle reception. The voltage impulse induced in this latter coil is amplified and shaped in the amplifier 32 to give a required reference trigger voltage pulse.

The recorder chart 28 is direct reading with respect to frequency and therefore the reference signal transmitted from the remote station must be printed on the 400 cycle line of the recorder chart as shown in Fig. 1*b*. In event of audio drift in the balloon borne transmitter, this is accomplished by controlling the time at which the time of balance circuit prints by controlling the slope of the sawtooth sweep available from 19 with an error signal derived from comparing the reference coincidence pulse with the reference trigger in an automatic reference control 31. Fig. 4 shows the sawtooth wave form with the proper slope to print the 400 cycle line at the correct position on the paper. If the slope of the sawtooth wave form were steeper as shown by the dotted line, then the coincidence pulse would come sooner and the 400 cycle line would be printed to the left of the correct position. However, the sawtooth wave form is automatically controlled by 31 of Fig. 3 to provide the correct slope.

Referring to Fig. 5, the automatic reference control 31 is shown comprising two passive multivibrator circuits 34 and 35 that are arranged to be triggered by the sawtooth synchronizing pulse available over lead 36, the reference trigger pulse available over lead 37 and the coincidence pulse available over lead 30 to provide wave shapes as shown in curves *b*, *b'*, *c*, *c'* of Fig. 6. These wave shapes reveal that a square wave of variable width depending upon the degree of separation between the time occurrence of the reference trigger and coincidence pulse and a polarity in each of two output channels indicative of the sense of occurrence of these two signals is provided. These square waves may be termed reference correction voltages and are employed to control the slope of the waves generated by sawtooth generator 19.

Referring to Fig. 5, tube 38, normally cut off by means of the negative bias applied to its grid 39 is caused to conduct upon the application of a positive sawtooth synchronizing impulse available over lead 36. This results in producing at the plate of tube 38 the negative going pulse *b* shown in Fig. 6. The trailing edge of pulse *b* is determined by the time of application of the positive reference trigger available over lead 37 and applied to grid 40 of tube 41 forming the other tube of the multivibrator circuit 34. Thus square waves of voltage *b* and *c* are available at the outputs of tubes 38 and 41. In a similar manner tubes 42 and 43 are caused to produce the wave shapes *d* and *e* of Fig. 6 by the application of the sawtooth synchronizing signal over lead 36 to the grid 44 of tube 42 and the application of the coincidence pulse available over lead 30 and applied to grid 45 of tube 43. The positive going square wave from tube 41 is differentially combined with the negative going square wave from tube 42 by means of the common lead 46 as shown in Fig. 5. Thus, since, in the illustration under consideration, the coincidence trigger occurred before the reference trigger, a positive going pulse *f* is available over lead 46. In a similar manner, the outputs of tubes 38 and 43 are combined over lead 47 to yield a negative going pulse *g* when the coincidence pulse occurs before the reference trigger. However, if instead, the reference trigger occurs before the coincidence pulse, signifying an increase in the timing frequency available from the airborne transmitter, the polarity of the voltages available at leads 46 and 47 is reversed as shown in graphs *f'* and *g'*.

Tubes 48 and 49 are provided to gate high frequency oscillations available from oscillator 50 under control of the voltages available over leads 46 and 47 to one or the other of channels 51 and 52. Tubes 48 and 49 are normally cut off by means of a negative bias applied to their second control grids 53 and 54 over lead 55. Tuned plate, tuned grid oscillator 50 continuously feeds a high frequency signal over lead 56 to the first control grids 57 and 58 of tubes 48 and 49 respectively. When a positive gating pulse is applied over leads 46 and 47 to control grids 53 or 54, the corresponding tube conducts the high frequency signal for the duration of the positive gating pulse. When the coincidence pulse comes before the reference trigger, tube 49 conducts whereas when the coincidence pulse comes after the reference trigger, tube 48 conducts. The gated high frequency signal of these tubes are fed to the diodes 59 or 60 over leads 51 and 52 respectively, whereby rectification of the radio frequency signal takes place. The purpose of this rectified voltage is, as will be explained shortly, to control the charging or discharging rate of a time constant circuit in the linear sawtooth generator 19 of Fig. 3. Use is made of rectified high frequency waves for effecting the slope control because of its relatively greater ease of transmission through the coupling circuits as contrasted with coupling a smoothed unidirectional voltage. In a preferred embodiment, the cathode 61 of tube 59 and the anode 62 of tube 60 are connected to a condenser 63 through a stepping switch 64, Figs. 5 and 7. During the one-half second of stepping switch action occurring during the 400 cycle reference portion of the transmission cycle of Fig. 1, the high frequency signal applied to the plate of tube 59 is rectified to discharge condenser 63 and when it is applied to the cathode of tube 60 it is rectified to charge condenser 63. A voltage divider 67*a* is provided to bias diodes 59 and 60 to proper operating levels with respect to any normal charge on condenser 63. The changing voltage on condenser 63 may be employed in 65 to control the slope of the sawtooth sweep circuit 66. Thus the gating of the high frequency signal to the proper diode effects the slope of the sawtooth generated by 19 in such a way as to drive the reference trigger toward the coincidence pulse. In this way the slope of the sawtooth is controlled automatically to print the reference frequency on the correct reference frequency line of the marking chart.

As previously mentioned, storage devices are employed for storing the various data being transmitted successively before application to a common recorder in order to provide more reliable operation. In order to insure that the proper data is stored in respective storage devices, the stepping switch arrangement shown in Fig. 7 is provided. The voltage required to drive this stepping switch is obtained in the following manner. Referring to Fig. 8, output pulses at the pulse recurrence rate of the various data obtained from pulse amplifier 9 of Fig. 3 are coupled to the grid electrode 67 of device 68 through condenser 69. Since this positive signal is to be employed to trigger the thyratron device 70, it is widened by the action of condensers 71 and 96 and resistor 72 to provide sufficient trigger width to ionize thyratron device 70 when applied to its grid 73. Gaseous device 70 is normally cut off by the negative bias applied over 74 to its grid electrode 73 such that condenser 75 charges toward B+ through resistor 76. The positive trigger pulses resulting from the meteorological pulses upon application to grid 73 cause condenser 75 to discharge through 70. This results in a series of sawtooth wave shapes 77 as shown in Fig. 9 which correspond in frequency to the meterological information. Thus, corresponding to the range of pulse recurrence rates encountered in the meteorological transmission a corresponding range of sawtooth voltage amplitudes will be obtained. These sawtooth waves are coupled directly to the grid 78 of device 79 which is normally cut off by having its cathode electrode 80 positively biased by resistor 81. When the normal meteorological pulses are triggering device 70, the voltages on the grid of device 79 do not rise enough to overcome this cathode bias and causes device 79 to conduct. During the 20 millisecond commutation interval shown in Fig. 1*a*, however, the sawtooth voltages rises sufficiently to overcome the bias and cause device 79 to conduct as shown by 82 in Fig. 9. The cathode of device 79 is bypassed by condenser 83 to provide a negative squared voltage wave shape at its plate electrode. This voltage is differentiated by condenser 84 and resistor 85 and then applied to the grid of device 86 where the leading edge of the voltage developed in device 79 is amplified. The resutlting positive pulses developed at the plate electrode of device 86 are used to trigger the thyratron 87 which drives the stepping relay 88. Thus, during the no modulation period of the transmission from the balloon, a stepping voltage is generated and applied to relay 88 to drive switches 13, 16, 64 and 89 of Fig. 7.

Referring to Figs. 7 and 8, it is noted that the trigger voltage is applied to the thyratron 87 through section 89 of the switch shown. This section 89 is so arranged that on the 1000 cycle lock-in position of the switch the thyratron trigger voltage has no path through this switch. The one thousand cycle unidirectional countervoltage is arranged to fire device 87 and close relay 88 by means of the following circuitry. When the stepping switch 13 of Fig. 7 is at the position for receiving the one thousand cycle countervoltage, this countervoltage is applied to the plate electrode of diode 90 over lead 91 of Fig. 8. A threshold control for diode 90 is provided in the form of potentiometer 91 whose movable tap is connected to the cathode of diode 90. The tap is adjusted such that only a unidirectional countervoltage above the level of normal data, i. e. corresponding to above 500 pulses per second, is passed through the diode 90 to the grid electrode 92 of device 93. Device 93 is caused to conduct heavily when the one thousand cycle unidirectional countervoltage is applied to its grid thereby causing current to flow through coil 94 in its cathode circuit which in turn closes contacts 95 thereby providing a path for the trigger voltage from device 86 to thyratron 87. This arrangement is provided to synchronize the stepping switch with the commutator in the airborne transmitter. If for some reason the stepping switch at the receiving point is a step ahead of or behind the airborne commutator, it will wait on the one thousand cycle position for relay 94 to close. When the relay closes, the switches will continue to step in synchronism with the commutator. Thus, by setting the threshold level for device 90, it can be arranged that the counteroutput from the meteorological frequencies will not close the relay, but that the counteroutput from the one thousand cycle signal will, thereby insuring identification of the correct data.

While I have disclosed as a preferred embodiment the application of my invention to indicating a plurality of data available originally as pulse recurrence rate modulation of radio waves, my invention lends itself readily to indicating information sampled sequentially and available in any form of modulation reducible to a variable amplitude unidirectional signal.

Furthermore, although in a preferred embodiment I disclose comparing a reference trigger produced at the ground station with a reference trigger transmtited from the remote station for controlling the slope of the sawtooth voltage indicative of the recording drum scan, an error signal generated in the manner disclosed may be employed to correct the direct current level indicative of the 400 cycle reference transmission from the remote station, or alternatively employed to control the mechanical sweep by the motor.

While I have shown only certain preferred embodiments of my invention by way of illustration, many modifications will occur to those skilled in the art and I therefore wish to have it understood that I intend, in the appended claims, to cover all such modifications as fall within the true spirit and scope of my invention.

What I claim as new and desire to secure by Letters Patent of the United States is:

1. In an arrangement for communicating data available as frequency modulation of an electrical signal over a given range under control of a timing circuit, means for transmitting a reference frequency within said range under control of said timing circuit, means for converting said frequency modulation to amplitude modulation of a direct voltage, means for generating a sawtooth wave having an amplitude range including the amplitude of said direct voltage, means for generating an impulse at a predetermined amplitude of said sawtooth wave corresponding to the reference frequency, means for comparing the amplitudes of said sawtooth wave and said direct voltage to derive an impulse in response to a predetermined ratio of said amplitudes, means for comparing the timing of said impulses to derive an error signal indicative of their time displacement, and means for controlling the slope of said sawtooth wave with said error signal to cause time coincidence of said impulses.

2. An arrangement for obtaining a negative or positive change in a control voltage proportional to the time interval between occurrence of two pulses and of a sense determined by which pulse comes first in time, comprising a source of reference pulses, means responsive to the output of said source and one of said pulses for generating first square waves of opposite polarity having a duration corresponding to the difference in time occurrence of said reference and said one of said two pulses, means responsive to the output of said source and the other of said pulses for producing second square waves of opposite polarity having a time duration corresponding to the difference in time occurrence of said reference and said other of said two pulses, and means for differentially combining said first and second square waves of opposite polarity to derive said control voltage.

3. An arrangement for obtaining a negative or positive change in a control voltage proportional to the time interval between occurrence of two pulses and of a sense determined by which pulse comes first in time comprising a source of reference pulses, means for generating first square waves of opposite polarity having a duration corresponding to the difference in time occurrence of said reference and one of said two pulses, means for producing second square waves of opposite polarity having a time duration corresponding to the difference in time occurrence of said reference and the other of said two pulses, and means for differentially combining said first and second square waves of opposite polarity to derive two separate control voltages, a pair of gating circuits each feeding a respective output channel, a source of oscillations coupled to each of said gating circuits, each of said gating circuits responsive to a respective control voltage of a given polarity for feeding said oscillations to a respective output channel.

4. An arrangement for obtaining a negative or positive change in a control voltage proportional to the time interval between occurrence of two pulses and of a sense determined by which pulse comes first in time comprising a source of reference pulses, means responsive to the output of said source and one of said pulses for generating first square waves of opposite polarity having a duration corresponding to the difference in time occurrence of said reference and said one of said two pulses, means responsive to the output of said source and the other of said pulses for producing second square waves of opposite polarity having a time duration corresponding to the difference in time occurrence of said reference and said other of said two pulses, means for differentially combining said first and second square waves of opposite polarity to derive two separate control voltages, and a sawtooth generator responsive to said control voltages for varying its slope accordingly.

5. An arrangement comprising a sawtooth generator, a source of three separate pulses, and means for controlling said sawtooth generator to vary the slope of the sawtooth waves generated by said sawtooth generator an amount proportional to the difference in time occurrence of two of said pulses and in a sense determined by which pulse comes first after said third pulse.

6. An arrangement for varying the slope of sawtooth waves generated by a sawtooth generator an amount proportional to the time displacement of two pulses and of a sense determined by which pulse comes first after a third pulse, comprising means for separately comparing the time displacement of each of said two pulses with respect to said third pulse to derive separate error pulses having a duration corresponding to said time displacements, means responsive to the duration and sense of said error pulses to derive control pulses over separate channels having a sense in each channel determined by which of said two pulses comes first after said third pulse, and means responsive to the amplitude and sense of said control pulses for controlling the slope of said sawtooth waves.

7. In an arrangement for communicating data each available as separate pulse recurrence rate modulation of carrier waves over a given range under control of a timing circuit wherein each of said data is successively transmitted for the same time interval, means for transmitting for said interval a reference pulse recurrence rate modulation of said waves within said range, means for receiving said transmissions, means for converting each of said received pulse recurrence rate modulations to respective amplitude modulations of a unidirectional voltage, means for generating a sawtooth wave of constant slope having an amplitude range including said range of unidirectional voltages and a duration corresponding to said time interval, means for generating reference pulses at a predetermined amplitude of said sawtooth waves corresponding to said reference recurrence rate, means responsive to coincidence of a predetermined ratio of amplitudes of said sawtooth waves and said unidirectional voltages to derive a coincidence pulse for each of said data, means for comparing the timing of the coincidence pulses corresponding to said reference recurrence rate transmissions and said reference pulses to derive error signals, means responsive to said error signals to control the slope of said sawtooth waves and thereby cause time coincidence of said reference and coincidence pulses.

8. In an arrangement for communicating data each available as separate modulation of the pulse recurrence rate of an electrical signal over a given modulation range under control of a timing circuit wherein each of said separate modulations are successively transmitted, means for separately transmitting pulses of a reference recurrence rate within said range, means for receiving and converting each of separately transmitted modulations to amplitude modulation of a unidirectional voltage, means for generating a nominally constant slope sawtooth wave having an amplitude range including said range of direct voltage and a duration corresponding to the time interval of transmission of each of said data, means for generating a reference pulse at the time of a predetermined amplitude of said sawtooth wave as a reference, means responsive to coincidence of a predetermined ratio of amplitudes of said sawtooth waves and said unidirectional voltages to derive a coincidence pulse for each of said data, means for comparing the timing of the coincidence corresponding to the reference recurrence rate transmission and said reference pulses to derive error signals, means responsive to said error signals to control the slope of said sawtooth waves and thereby cause time coincidence of said reference and coincidence pulses.

9. The arrangement as defined in claim 3, further comprising means to rectify the oscillations in each said output channel.

10. In combination, means to provide a first electric signal representative of a first condition, means to provide a second electric signal representative of a second condition normally occurring at a time other than that of said first condition, said first and said second signals characterized by a time separation corresponding to times of occurrence of said conditions, and means responsive to said first and second signals to produce a unidirectional impulse having a duration corresponding to the magnitude of said time separation and having a polarity corresponding to the relative order of occurrence of said first and said second conditions.

11. In combination, means to provide a first electric signal representative of a first condition, means to provide a second electric signal representative of a second condition normally occurring at a time other than that of said first condition, whereby said first and said second signals are characterized by a time separation corresponding to times of occurrence of said conditions, and means including a source of oscillations and a gating circuit coupled to said source and responsive to said first and second signals to produce a unidirectional impulse having a duration corresponding to the magnitude of said time separation and having a sense corresponding to the order of occurrence of said first and said second condition.

12. An arrangement for obtaining a change in a control voltage proportional to the time interval between the occurrence of two pulses, comprising a source of reference pulses, means responsive to said reference pulses for generating a first pair of square waves having a duration corresponding to the difference in time occurrence of said reference and one of said two pulses, means responsive to said reference pulses for generating a second pair of square waves having a time duration corresponding to the difference in time occurrence of said reference and the other of said two pulses, and means for combining said first and second pairs of square waves to derive said control voltage.

13. The arrangement as defined in claim 12, wherein said last-named means comprises gating circuit means feeding a pair of transmission channels, a source of oscillations, said gating circuit means responsive to said control voltage to feed said oscillations to said channels.

14. An arrangement for obtaining a change in a control voltage proportional to the time interval between the occurrence of two pulses, comprising a source of reference pulses, means responsive to said reference pulses for generating a first pair of square waves having a duration corresponding to the difference in time occurrence of said reference and one of said two pulses, means responsive to said reference pulses for generating a second pair of square waves having a time duration corresponding to the difference in time occurrence of said reference and the other of said two pulses, and means for combining said first and second pairs of square waves to derive two separate control voltages, a pair of gating circuits each feeding a respective output channel, a source of oscillations coupled to each of said gating circuits, each of said gating circuits responsive to a respective control voltage for feeding said oscillations to a respective output channel.

15. In an arrangement for communicating data available as frequency modulation of an electrical signal under control of a timing circuit, means for transmitting a reference frequency under control of said timing circuit, means for converting said frequency modulation to amplitude modulation of a direct voltage, means for generating a sawtooth wave having a predetermined amplitude range, means for generating an impulse at a predetermined amplitude of said sawtooth wave corresponding to the reference frequency, means for combining said sawtooth wave and said direct voltage to derive an impulse in response to a predetermined ratio of the amplitudes thereof, means for comparing the timing of said impulses to derive an error signal indicative of their time displacement, and means for controlling the slope of said sawtooth wave with said error signal to cause time coincidence of said impulses.

16. An arrangement for deriving an output signal from a first and second input signal comprising means adapted to respond to the relative time displacement of said input signals for producing an output signal having a corresponding time duration, and means responsive to one order of time occurrence of said input signals for providing a positive polarity for said output signal, and responsive to another order of time occurrence of said input signals for providing a negative polarity for said output signal.

17. An arrangement for deriving an output signal from a first, second, and third input signal comprising a first multivibrator adapted to respond to the relative time displacement of said first and third input signals for producing a first pair of opposite polarity output waves each having a corresponding time duration, a second multivibrator adapted to respond to the relative time displacement of said second and third input signal for producing a second pair of opposite polarity output waves each having a corresponding time duration, and means responsive to one order of time occurrence of said two pairs of output waves for providing a positive polarity output signal, and responsive to a second order of time occurrence of said two pairs of output waves for providing a negative polarity output signal.

References Cited in the file of this patent

UNITED STATES PATENTS

| | | |
|---|---|---|
| 1,597,828 | Roucka | Aug. 31, 1926 |
| 2,226,459 | Bingley | Dec. 24, 1940 |
| 2,252,599 | Lewis | Aug. 12, 1941 |
| 2,448,069 | Sunstein | Aug. 31, 1948 |
| 2,448,070 | Ames | Aug. 31, 1948 |
| 2,466,804 | Giffen | Apr. 12, 1949 |
| 2,477,076 | Miller | July 26, 1949 |
| 2,540,167 | Houghton | Feb. 6, 1951 |
| 2,575,087 | Baker | Nov. 13, 1951 |
| 2,576,339 | Gray | Nov. 27, 1951 |

FOREIGN PATENTS

| | | |
|---|---|---|
| 590,886 | Great Britain | July 31, 1942 |

UNITED STATES PATENT OFFICE

CERTIFICATE OF CORRECTION

Patent No. 2,797,403 June 25, 1957

Thomas E. Woodruff

It is hereby certified that error appears in the printed specification of the above numbered patent requiring correction and that the said Letters Patent should read as corrected below.

Column 10, line 21, strike out "first and second signals to produce a unidirectional im-" and insert the same after "said", second occurrence, in line 22, same column.

Signed and sealed this 3rd day of September 1957.

(SEAL)
Attest:
KARL H. AXLINE

Attesting Officer

ROBERT C. WATSON
Commissioner of Patents